Sept. 4, 1962   F. M. WALTERS III   3,052,860
RADIO FREQUENCY CHOKE
Original Filed Sept. 17, 1945   2 Sheets-Sheet 2
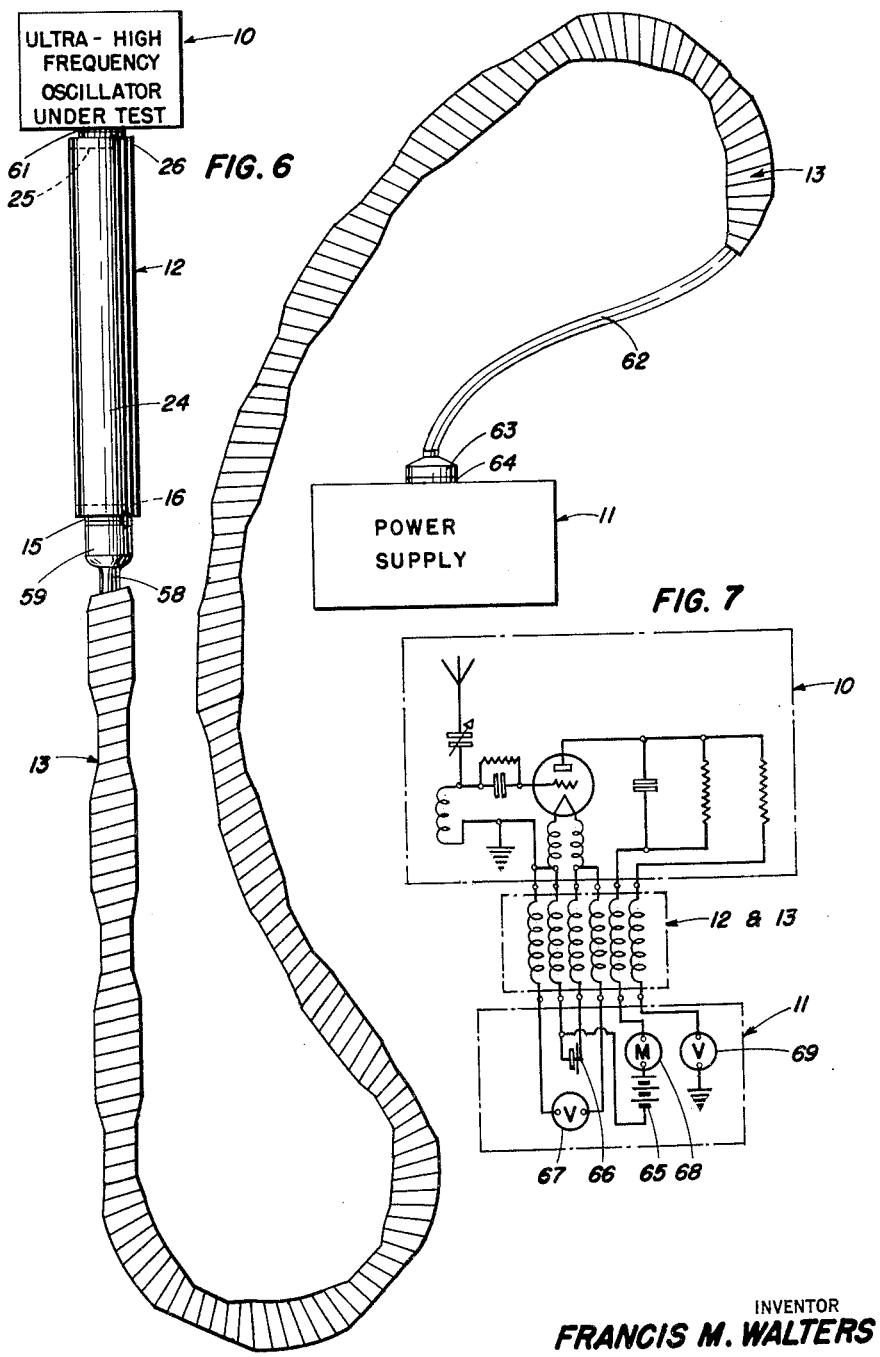
INVENTOR
FRANCIS M. WALTERS III
BY
ATTORNEY

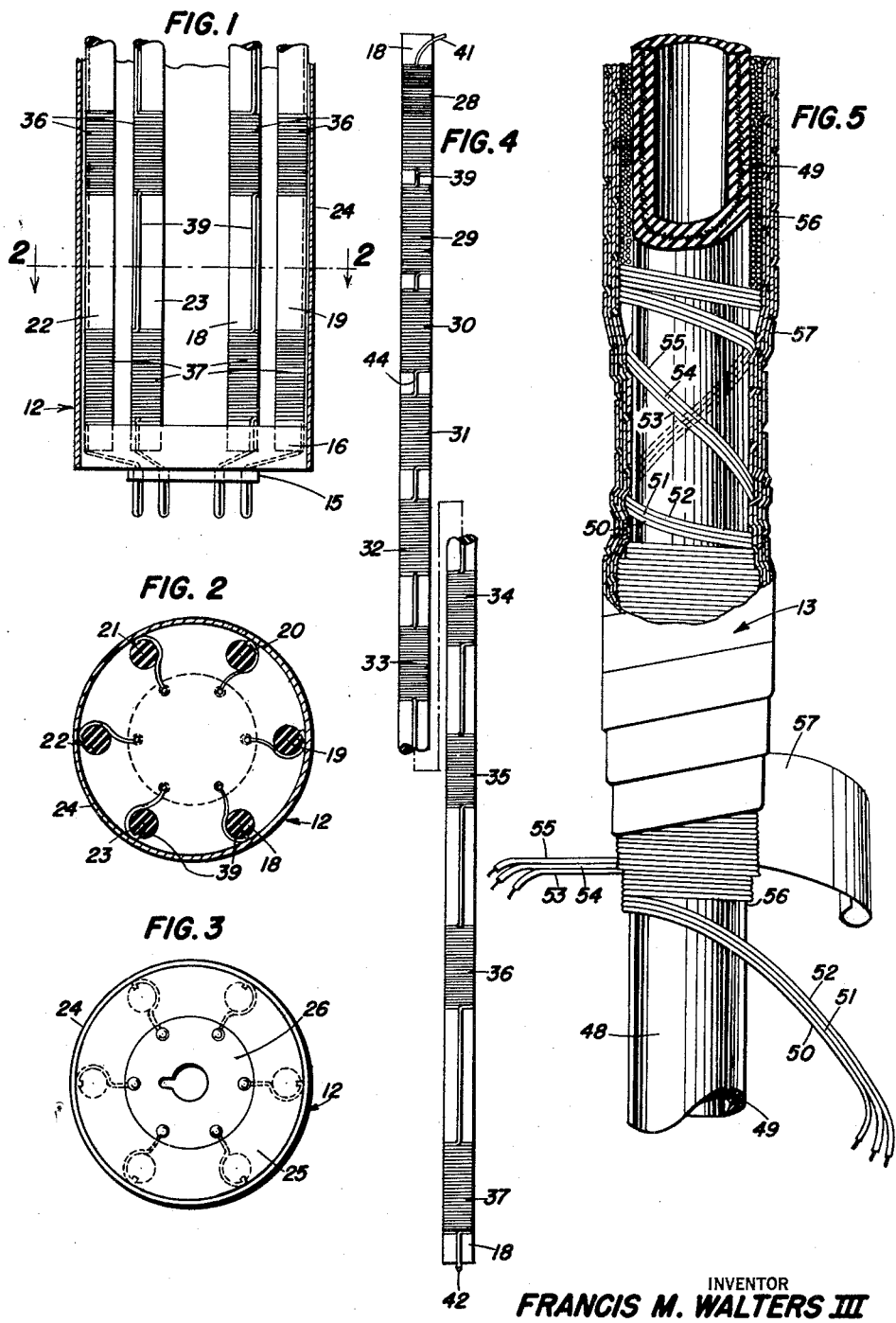

United States Patent Office 3,052,860
Patented Sept. 4, 1962

3,052,860
RADIO FREQUENCY CHOKE
Francis M. Walters III, Washington, D.C., assignor to the United States of America as represented by the Secretary of the Navy
Original application Sept. 17, 1945, Ser. No. 616,916, now Patent No. 3,009,125, dated Nov. 14, 1961. Divided and this application June 30, 1954, Ser. No. 440,573
1 Claim. (Cl. 336—180)

The present invention relates generally to electrical testing apparatus and more particularly to an improved multiple conductor and choke arrangement for connecting high frequency signaling apparatus, such as an electron tube and associated circuits under test, to power supply sources and metering devices.

This application is a division of copending U.S. Patent application, Serial No. 616,916, now U.S. Patent No. 3,009,125, filed September 17, 1945, by the same inventor.

In conducting production tests for the determination of plate current, output signal voltage, filament voltage, and other characteristics of tubes and circuits of the type designed to be energized by extremely short-life batteries, such as the oscillator tube and associated circuits incorporated in a proximity fuze and energized in actual operation by a battery having a useful life measured in a few minutes, it is necessary to provide a permanent power supply and a quick-detachable connecting arrangement for coupling the apparatus under test to the supply and metering devices. If a battery of the short-life type were employed the test would be rendered inaccurate by the rapid change in battery voltage and internal resistance caused by consumption of its energy. When the apparatus under test is designed to generate or to receive high frequency radiant-energy signals, it is necessary to isolate it from the meters and permanent power supply in order to prevent the proximity of their metal components from so disturbing the normal functioning of the apparatus as to preclude the simulation of conditions experienced in its actual operation.

It is, therefore, an object of the present invention to facilitate production and laboratory testing by providing an improved arrangement of choke coils and conductors which may be employed in connecting conventional permanent power supply and metering devices to a radio signaling circuit of the high-frequency type, normally intended to be battery operated, in order to render feasible the use of such source of energy in lieu of the short-life battery normally used in operation. Such a system offers important advantages in that a separate permanent power supply can maintain a uniform voltage, so that the tests are not affected by battery voltage drops.

Time and expense are saved by avoiding battery costs and interruptions caused by exchanging batteries during testing operations. It will be understood that batteries of unusually small size are often more costly than larger batteries having corresponding performance characteristics. The system offers a further advantage in that it permits the introduction of measuring instruments of good stability and sensitivity into the various tube circuits and the conducting of measurements at a remote location.

The novel features which are believed to be characteristic of this invention are set forth with particularity in the appended claim. The invention itself, however, both as to its organization and method of operation, together with further objects and advantages thereof, will best be understood by reference to the following specification taken in connection with the accompanying drawings, in which:

FIG. 1 is a fragmentary elevational view of a choke assembly in accordance with the present invention, partly in section;

FIG. 2 is a sectional view taken in plane 2—2 of FIGURE 1;

FIG. 3 is a plan view of the choke assembly.

FIG. 4 is an elevation of one of the rods and chokes included in the FIG. 1 embodiment;

FIG. 5 is an elevational view, partly broken away and in section, showing details of the cable for making connection between the choke assembly and the power source and metering devices;

FIG. 6 is a perspective view of the choke assembly and cable assembly; and

FIG. 7 is a circuit schematic of a radio signaling circuit of the type adapted to be tested by the use of apparatus provided in accordance with the present invention, showing the circuit relationship between the apparatus under test and the choke circuits.

Referring now specifically to FIGURE 6 of the drawing, there are illustrated an ultra-high frequency oscillator 10 (in block form), a power supply 11, and a choke and conductor arrangement provided in accordance with the present invention for connecting the oscillator to the power supply. This arrangement comprises a choke assembly 12 and a cable assembly 13.

Referring now specifically to FIGURE 1 there is illustrated the lower end of the choke unit. This unit comprises a plug 15 having prongs for making connections to the cable unit 13. The plug is secured to a base 16, which supports a plurality of rods of insulating material 18, 19, 20, 21, 22 and 23. A protective casing 24, secured at one end of base 16, encloses the rods. Referring to FIGURE 3 it will be seen that the rods are maintained in rigid assembly by a top disc 25, also secured to the rods and the casing. The disc has a socket 26 mounted thereon.

The rods serve as support forms for the windings of the chokes and are generally similar. Rod member 18 has been selected for detailed illustration in FIGURE 4 and is there broken in order to disclose its structure on a relatively large scale. It will be understood that the parameters and dimensions herein given are set forth for purposes of illustration and not of limitation. At the upper rod end is a coil 28 which may be provided by winding No. 30 enameled wire in a groove ⅞" in length. This coil is spaced ¼" from the top of the rod, leaving a free portion for insertion into disc 25. A free space ⅛" in length is left at the other end of coil 28 and second coil 29 is wound with No. 28 wire in the next groove, which is ¾" in length. Again a space ⅛" long is left between grooves and the next coil 30 is wound with No. 28 wire in a groove ¹¹⁄₁₆" in length. In like manner coils 31, 32, 33, 34, and 35 are wound with No. 26 wire on grooves ⅝" in length, each spaced from the preceding coil by ³⁄₁₆", ¼", ⁷⁄₁₆", ⅝", and ¾" respectively. It will be noted that although the last mentioned five coils are the same in other respects, they are spaced at progressively increasing distances from each other.

After a free space of 1" a coil 36 is wound with No. 24 wire on an ¹¹⁄₁₆" groove. Another coil 37 wound with No. 24 wire to fill a groove ¾" in length is spaced approximately 1⅛" from coil 36. There follows a final free rod portion which is received in base 16.

In the winding operation the windings on each rod are serially related and the wire is led from each coil to the adjacent one through a longitudinal channel 39 which may extend the entire length of the rod. The fine wire lead 41 of each group is connected to one of the contacts of socket 26, while the heavy wire lead 42 is connected to a corresponding prong of plug 15. Slot 39 is wide enough to accommodate the soldered joints between the wires or differing sizes, as shown at 44.

The guiding principles of the choke unit portion of the invention, and applied in the specific embodiment described are:

(1) The choke nearest to the apparatus under test should have the highest inductance, and therefore, a relatively large number of turns of fine wire;

(2) The most remote choke has fewer turns and preferably is wound of wire having a larger diameter, in order to minimize the resistance of the entire choke unit;

(3) The mutual inductance or coupling between successive coils is undesirable and is minimized by spacing the coils apart;

(4) The spacing between the coils increases from the high inductance end to the low inductance end, the spaces initially being shorter than the windings and finally being longer than the windings;

(5) The wires in successive inductances increase in diameter and decrease in number of turns, in order, the length of each coil preferably being greater than twice its diameter.

Referring now generally to FIGURE 5 cable 13 is there illustrated in detail. It comprises a rubber tube 48 reinforced with canvas 49. The cable comprises a plurality of conductors 50, 51, 52, 53, 54, and 55, adapted to be coupled to the windings on rods 18, 19, 20, 21, 22, and 23 respectively. The conductors are arranged in two groups of three, wires 50, 51, and 52 in one group and 53, 54, and 55 in the other. Each group forms a ribbon-like assemblage wound as a trifilar coil on the tubing 48. A winding 56 comprising conductors 50, 51, and 52 and about 3" in length is made on the tubing. A free space of about 2" is left, followed by another 3" winding, and this process is continued through the entire desired length of cable. Between these windings, the wires proceed in a helix of relatively great lead as shown in the dotted line conductors 50, 51, and 52 in the upper portion of FIGURE 5.

The conductors 53, 54, and 55 also grouped as a ribbon-like assemblage, are wound as a second layer above the wires of the first group so as to make each closely wound section two layers in depth. These wires then similarly pass to the next 3" winding by a helical turn of large lead as shown, and conveniently on the opposite side of tubing 48.

Finally a winding of rubber tape 57 is applied over the coils of the cable. Unit 13, as shown in detail in FIGURE 6, has a short length of standard rubber covered cable 58, with the required number of conductors, connected at one end, cable 58 terminating in a socket 59, adapted to receive the prongs of the rigid choke assembly plug 15. Socket 26 at the upper end of the choke assembly is adapted to receive suitable prongs projecting from plug 61 associated with the oscillator under test.

At its other end cable 13 terminates in another relatively short length of standard rubber covered cable 62, and plug 63 is attached to the end of section 62 for connection to a corresponding socket 64 in power supply 11.

The above described system of chokes and conductors is adapted to be employed in testing electronic apparatus of the general class schematically shown in FIGURE 7 and also in FIGURE 7 of the drawing of the copending application of Lorence W. Fraser, Serial No. 561,449, filed in the United States Patent Office on November 1, 1944, entitled "Testing Apparatus" and assigned to the same assignee as the present invention; reference is made to said application for a complete description of such electronic signaling apparatus. The units shown in dashed outlines in FIGURE 7 bear the same reference numerals as the corresponding units disclosed in FIGURE 6. Included in the power supply and metering unit 11 are a source 65 of direct anode current and a source 66 of direct filament heating current, as well as a voltmeter 67 for measuring filament. Voltage of the oscillator under test, an ammeter 68 for measuring its plate current, and a voltmeter 69 for measuring the magnitude of the output signal voltage. Each of plug 61 and socket 26, plug 15 and socket 59, plug 63, and socket 64 include six mating contact terminals so arranged, in a manner well known to those skilled in the art, as to connect the power sources and metering devices to the proper oscillator circuits.

In operation, the radiation resistance of the oscillator antenna and ground circuit is varied at an audio-frequency rate, and the oscillator generates in its plate circuit an audio-frequency signal, the magnitude of which is measured by voltmeter 69. Meter 68 measures plate current and meter 67 indicates filament voltage, and the system of chokes and conductors provided in accordance with the invention has such operation that the oscillator 10 is so isolated for radio or carrier frequency signals from the unit 11, that neither the transmission nor the reception characteristics of the unit under test are adversely affected by the power supply unit 11. The result is that the test conditions fully correspond to the service conditions obtaining when small batteries are used.

While there has been shown and described what is at present believed to be the preferred embodiment of the invention, it will be obvious to those skilled in the art that various changes and modifications may be made therein without departing from the spirit of the invention, and it is accordingly intended, in the appended claim, to cover all changes and modifications that fall within the true scope of the invention and outside the scope of the prior art.

What is claimed is:

A radio frequency choke comprising an insulating core, a group of serially related inductive windings, said group of windings being carried by said core, each winding consisting of a plurality of turns, the number of turns of each winding decreasing from the number of turns of the preceding winding, the wire diameter of each winding increasing from that of the preceding winding, the spacing between each winding increasing from that of the preceding winding, with the length of each winding being twice the coil diameter of each winding.

References Cited in the file of this patent

UNITED STATES PATENTS

| | | |
|---|---|---|
| 2,163,775 | Conklin | June 27, 1939 |
| 2,363,101 | Van Der Heem | Nov. 24, 1944 |